(12) United States Patent
Sheasley et al.

(10) Patent No.: US 7,438,782 B2
(45) Date of Patent: Oct. 21, 2008

(54) ACTIVATABLE MATERIAL FOR SEALING, BAFFLING OR REINFORCING AND METHOD OF FORMING SAME

(75) Inventors: David Sheasley, Rochester, MI (US); David Kosal, Richmond, MI (US); Jeanne Antrim, Lake Orion, MI (US)

(73) Assignee: Zephyros, Inc., Romeo, MI (US)

( * ) Notice: Subject to any disclaimer, the term of this patent is extended or adjusted under 35 U.S.C. 154(b) by 42 days.

(21) Appl. No.: 11/422,705

(22) Filed: Jun. 7, 2006

(65) Prior Publication Data

US 2007/0284036 A1     Dec. 13, 2007

(51) Int. Cl.
*B29C 65/00*   (2006.01)
*B32B 37/00*   (2006.01)
*C08F 283/00*  (2006.01)
*C08G 59/14*   (2006.01)
*C08L 63/00*   (2006.01)

(52) U.S. Cl. ...................... 156/293; 525/524
(58) Field of Classification Search ............ 156/293; 525/524
See application file for complete search history.

(56) References Cited

U.S. PATENT DOCUMENTS

| | | | |
|---|---|---|---|
| 4,173,596 A * | 11/1979 | De Witt | 428/402 |
| 4,427,481 A * | 1/1984 | Smith et al. | 156/306.6 |
| 4,538,380 A | 9/1985 | Colliander | |
| 4,693,775 A | 9/1987 | Harrison et al. | |
| 4,724,243 A | 2/1988 | Harrison | |
| 4,749,434 A | 6/1988 | Harrison | |
| 4,769,166 A | 9/1988 | Harrison | |
| 4,898,630 A | 2/1990 | Kitoh et al. | |
| 4,922,596 A | 5/1990 | Wycech | |
| 4,923,902 A | 5/1990 | Wycech | |
| 4,978,562 A | 12/1990 | Wycech | |
| 4,995,545 A | 2/1991 | Wycech | |
| 5,124,186 A | 6/1992 | Wycech | |
| 5,266,133 A | 11/1993 | Hanley et al. | |
| 5,274,006 A | 12/1993 | Kagoshima et al. | |
| 5,470,886 A | 11/1995 | Makhlouf et al. | |
| 5,475,039 A | 12/1995 | Butikofer | |
| 5,575,526 A | 11/1996 | Wycech | |
| 5,648,401 A | 7/1997 | Czaplicki et al. | |
| 5,712,317 A | 1/1998 | Makhlouf et al. | |
| 5,755,486 A | 5/1998 | Wycech | |
| 5,783,272 A | 7/1998 | Wong | |

(Continued)

FOREIGN PATENT DOCUMENTS

EP    0 442 178 A1    8/1991

(Continued)

OTHER PUBLICATIONS

Polymethacrylate article, (polymerprocessing.com).*

(Continued)

*Primary Examiner*—Philip C Tucker
*Assistant Examiner*—Michael N Orlando
(74) *Attorney, Agent, or Firm*—Dobrusin & Thennisch PC

(57) ABSTRACT

An activatable material and articles incorporating the same is disclosed. The activatable material includes at least two of epoxy resin; impact modifier; blowing agent; curing agent; and filler. The activatable material is preferably used for sealing, baffling, adhering or reinforcing an article of manufacture such as an automotive vehicle.

20 Claims, 1 Drawing Sheet

U.S. PATENT DOCUMENTS

| | | | |
|---|---|---|---|
| 5,783,298 | A | 7/1998 | Herring, Jr. et al. |
| 5,884,960 | A | 3/1999 | Wycech |
| 5,894,071 | A | 4/1999 | Merz et al. |
| 5,932,680 | A | 8/1999 | Heider |
| 5,948,508 | A | 9/1999 | Pastore et al. |
| 5,964,979 | A | 10/1999 | George et al. |
| 5,985,435 | A | 11/1999 | Czaplicki et al. |
| 5,994,423 | A | 11/1999 | Born et al. |
| 6,004,425 | A | 12/1999 | Born et al. |
| 6,030,701 | A | 2/2000 | Johnson et al. |
| 6,040,350 | A | 3/2000 | Fukui |
| 6,057,382 | A | 5/2000 | Karim et al. |
| 6,077,884 | A | 6/2000 | Hess et al. |
| 6,096,791 | A | 8/2000 | Born et al. |
| 6,103,784 | A | 8/2000 | Hilborn et al. |
| 6,111,015 | A * | 8/2000 | Eldin et al. .......... 525/65 |
| 6,133,335 | A | 10/2000 | Mahoney et al. |
| 6,136,398 | A | 10/2000 | Willett et al. |
| 6,136,944 | A | 10/2000 | Stewart et al. |
| 6,153,302 | A | 11/2000 | Karim et al. |
| 6,162,504 | A | 12/2000 | Hubert et al. |
| 6,174,932 | B1 | 1/2001 | Pachl et al. |
| 6,218,442 | B1 | 4/2001 | Hilborn et al. |
| 6,228,449 | B1 | 5/2001 | Meyer |
| 6,232,433 | B1 | 5/2001 | Narayan |
| 6,235,842 | B1 | 5/2001 | Kuwano et al. |
| 6,263,635 | B1 | 7/2001 | Czaplicki |
| 6,277,898 | B1 | 8/2001 | Pachl et al. |
| 6,287,669 | B1 | 9/2001 | George et al. |
| 6,303,672 | B1 | 10/2001 | Papalos et al. |
| 6,312,668 | B2 | 11/2001 | Mitra et al. |
| 6,319,964 | B1 | 11/2001 | Blank et al. |
| 6,348,513 | B1 | 2/2002 | Hilborn et al. |
| 6,350,791 | B1 | 2/2002 | Feichtmeir et al. |
| 6,376,564 | B1 | 4/2002 | Harrison |
| 6,419,305 | B1 | 7/2002 | Larsen |
| 6,429,244 | B1 | 8/2002 | Rinka et al. |
| 6,432,475 | B1 | 8/2002 | Yamamoto et al. |
| 6,437,055 | B1 | 8/2002 | Moriarity et al. |
| 6,440,257 | B1 | 8/2002 | Zhou et al. |
| 6,441,075 | B2 | 8/2002 | Hirata et al. |
| 6,441,081 | B1 | 8/2002 | Sadatoshi et al. |
| H2047 | H | 9/2002 | Harrison et al. |
| 6,444,149 | B1 | 9/2002 | Valentinsson |
| 6,444,713 | B1 | 9/2002 | Pachl et al. |
| 6,448,338 | B1 | 9/2002 | Born et al. |
| 6,451,231 | B1 | 9/2002 | Harrison et al. |
| 6,451,876 | B1 | 9/2002 | Koshy |
| 6,455,146 | B1 | 9/2002 | Fitzgerald |
| 6,455,476 | B1 | 9/2002 | Imai et al. |
| 6,467,834 | B1 | 10/2002 | Barz et al. |
| 6,471,285 | B1 | 10/2002 | Czaplicki et al. |
| 6,478,915 | B1 | 11/2002 | Schmalbruch et al. |
| 6,479,560 | B2 | 11/2002 | Freitag et al. |
| 6,482,486 | B1 | 11/2002 | Czaplicki et al. |
| 6,486,256 | B1 | 11/2002 | Tarbutton et al. |
| 6,506,494 | B2 | 1/2003 | Brandys et al. |
| 6,561,571 | B1 | 5/2003 | Brennecke |
| 6,573,309 | B1 | 6/2003 | Reitenbach et al. |
| 6,620,501 | B1 | 9/2003 | Kassa et al. |
| 6,682,818 | B2 * | 1/2004 | Czaplicki et al. .......... 428/413 |
| 6,949,602 | B2 | 9/2005 | Gosiewski et al. |
| 2002/0009582 | A1 | 1/2002 | Golden |
| 2002/0120064 | A1 | 8/2002 | Khandpur et al. |
| 2002/0123575 | A1 | 9/2002 | Kato et al. |
| 2002/0136891 | A1 | 9/2002 | Khandpur et al. |
| 2002/0137808 | A1 | 9/2002 | Gehlsen et al. |
| 2003/0050352 | A1 | 3/2003 | Guenther et al. |
| 2003/0067187 | A1 | 4/2003 | Curtiss et al. |
| 2003/0186049 | A1 | 10/2003 | Czaplicki et al. |
| 2003/0187129 | A1 | 10/2003 | Bell et al. |
| 2004/0048078 | A1 | 3/2004 | Czaplicki et al. |
| 2004/0079478 | A1 | 4/2004 | Merz |
| 2004/0204551 | A1 * | 10/2004 | Czaplicki et al. .......... 525/524 |
| 2004/0204554 | A1 | 10/2004 | Czaplicki et al. |
| 2004/0221953 | A1 * | 11/2004 | Czaplicki et al. .......... 156/293 |
| 2004/0266898 | A1 | 12/2004 | Kassa et al. |
| 2005/0016677 | A1 | 1/2005 | Carlson et al. |
| 2005/0159531 | A1 | 7/2005 | Ferng et al. |
| 2005/0221046 | A1 | 10/2005 | Finerman |
| 2005/0230027 | A1 | 10/2005 | Kassa et al. |
| 2005/0241756 | A1 | 11/2005 | Harthcock et al. |
| 2007/0095475 | A1 | 5/2007 | Hable et al. |
| 2007/0101679 | A1 | 5/2007 | Harthcock et al. |

FOREIGN PATENT DOCUMENTS

| | | |
|---|---|---|
| JP | 4059820 | 2/1992 |
| JP | 09-316169 A | 9/1997 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/34453 | 5/2001 |
| WO | WO 01/41950 | 6/2001 |
| WO | WO 01/57130 | 8/2001 |
| WO | WO 01/58741 | 8/2001 |
| WO | WO 01/88033 | 11/2001 |
| WO | WO 02/26551 | 4/2002 |
| WO | WO 03/072677 | 9/2003 |
| WO | WO 03/078163 | 9/2003 |

OTHER PUBLICATIONS

Polybutadiene—Properties, Applications, Processing and Types, (azom.com).*

"The Epoxy Book", A System Three Resins Publication, pp. 1-41, System Three Resins, Inc., Seattle, Washington.

"Epoxy Resins", Second Edition Encyclopedia of Polymer Science and Engineering, vol. 6, pp. 322-382, 1985.

Copending U.S. Appl. No. 11/188,679, filed Jul. 25, 2005.

Copending U.S. Appl. No. 60/731,714, filed Oct. 31, 2005.

* cited by examiner

ACTIVATABLE MATERIAL FOR SEALING, BAFFLING OR REINFORCING AND METHOD OF FORMING SAME

FIELD OF THE INVENTION

The present invention relates generally to an activatable material, a method of forming the activatable material and a method of using the activatable material for sealing, baffling, adhering or reinforcing of components of articles of manufacture such as automotive vehicles.

BACKGROUND OF THE INVENTION

For many years industry, and particularly the transportation industry has been concerned with sealing, baffling, acoustic attenuation, adhesion and reinforcement of articles of manufacture such as automotive vehicles. In turn, industry has developed a wide variety of materials for providing such sealing, baffling, adhesion and reinforcement. The present invention, therefore, seeks to provide an improved material for sealing, baffling, adhesion or reinforcement, a method of forming the improved material and a method for use of the improved material for reinforcing, sealing, adhering or baffling.

SUMMARY OF THE INVENTION

Accordingly, a method of adhesion is disclosed. The method comprises provision of an activatable material. The activatable material typically includes epoxy resin; epoxy/elastomer adduct; a core/shell polymer impact modifier; and a curing agent. The activatable material is typically located adjacent a first surface and a second surface of an article of manufacture. The activatable material is then typically activated to bond the activatable material to the first surface and second surface,

DETAILED DESCRIPTION

Figure 1:
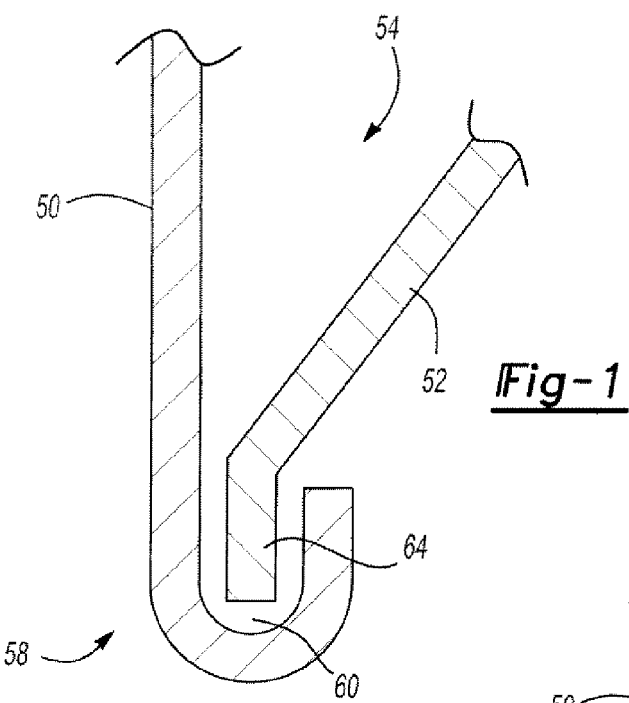
FIG. 1 is a sectional view of members to be joined in accordance with an aspect of the present inventions

The present invention is predicated upon provision of an improved activatable material, and articles incorporating the same. The activatable material preferably assists in providing structural reinforcement, adhesion, sealing, baffling, vibrational damping properties or a combination thereof within a cavity of, or upon a surface of a structure, or to one or more structural members (e.g., a body panel or structural member) of an article of manufacture (e.g., an automotive vehicle). In one particular embodiment, the activatable material has been found particularly useful for joining and/or adhering to surfaces of metal components (e.g., metal vehicle panels). As used herein, the phrase activatable material includes any material that may be activated to melt, flow, cure (e.g., thermoset), expand, foam or a combination thereof by an ambient condition or another condition, For example, the material may expand, foam, flow, melt, cure, any combination thereof or the like upon exposure to a condition such a heat, pressure, chemical exposure, combinations thereof or the like.

The activatable material typically includes a polymeric admixture, an impact modifier and one or a combination of a blowing agent, a curing agent and a filler. The activatable material preferably includes at least three of the following:
 a. about 2 to about 80 percent by weight epoxy resin;
 b. about 2 to about 70 percent by weight polymer (e.g., epoxy)/elastomer adduct;
 c. one or more additional polymers, which typically include a one or more ethylene polymers or copolymers;
 d. about 2 to about 70 percent by weight impact modifier;
 e. about 0.1 to about 30 percent by weight thermoplastic polyether;
 f. up to about 5 parts by weight of a blowing agent;
 g. up to about 7 parts by weight of a curing agent; and
 h. a filler.

The concentration may be higher or lower depending upon the intended application of the activatable material. In a preferred aspect of the invention, the impact modifier includes one or more core/shell polymers, although not necessarily required.

The activatable material of the present invention may be applied to various articles of manufacture for adhering members to each other adding structural integrity to portions or members of articles, for providing acoustical damping to the articles or for sealing the articles. Examples of such articles of manufacture include, without limitation, household or industrial appliances, furniture, storage containers, buildings, structures or the like. In preferred embodiments, the activatable material is applied to portions of an automotive vehicle such as body components (e.g., panels such as inner and/or outer body panels) or frame members (e.g., a vehicle frame rail) of the automotive vehicle. One method of the present invention contemplates applying the activatable material to a surface of one of the above structures in an unexpanded or partially expanded state and activating the material for expanding (e.g., foaming) it to a volume greater than its volume in the unexpanded state (e.g., at least 5% greater, at least 50% greater, at least 200% greater, at least 1000% greater, at least 2000% greater, at least 5000% greater or higher). It is also contemplated that the volume of the material may be less after activation due to curing (e.g., cross-linking) for foamed or unfoamed versions of the activatable material.

Percentages herein refer to weight percent, unless otherwise indicated.

Epoxy Resin

Epoxy resin is used herein to mean any of the conventional dimeric, oligomeric or polymeric epoxy materials containing at least one epoxy functional group. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes up to about 80% or more of an epoxy resin. More preferably, the expandable includes between about 2% and 70% by weight epoxy resin and still more preferably between about 4% and 30% by weight epoxy resin, Of course, amounts of epoxy resin may be greater or lower depending upon the intended application of the activatable material. As an example, it is contemplated that weight percentages may be lower or higher when other ingredients such as the adduct, filler, alternative polymers, combinations thereof or the like are used in greater or lesser weight percentages.

The epoxy may be aliphatic, cycloaliphatic, aromatic or the like. The epoxy may be supplied as a solid (e.g., as pellets, chunks, pieces or the like) or a liquid (e.g., an epoxy resin), As used herein, unless otherwise stated, a resin is a solid resin if it is solid at a temperature of 23° C. and is a liquid resin if it a liquid at 23° C. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the activatable material to increase the adhesion, flow properties or both of the material. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Moreover, various mixtures of several different epoxy resins may be employed as well. Examples of suitable epoxy resins are sold under the tradename DER® (e.g., DER 331, DER 661, DER 662), commercially available from the Dow Chemical Company, Midland, Mich.

In preferred embodiments, the activatable material will typically include at least about 5% and more typically at least about 10% by weight epoxy resin. The activatable material may also include less that about 50% and more typically less than about 22% by weight epoxy resin.

Adduct

While it is contemplated that various polymer/elastomer adducts may be employed according to the present invention, one preferred adduct is an epoxy/elastomer adduct. In a highly preferred embodiment, an elastomer-containing adduct is employed in the activatable material of the present invention in a relatively high concentration. The epoxy/elastomer hybrid or adduct may be included in an amount of up to about 80% by weight of the adhesive material. More preferably, the elastomer-containing adduct is approximately at least 5%, more typically at least 17% and even more typically at least 22% by weight of the activatable material and can be up to 60% or more, but more preferably is less than about 35% by weight of the activatable material. Of course, the elastomer-containing adduct may be a combination of two or more particular adducts and the adducts may be solid adducts or liquid adducts at a temperature of 23° C. or may also be combinations thereof. In one preferred embodiment, the adduct is composed of substantially entirely (i.e., at least 70%, 80%, 90% or more) of one or more adducts that are solid at a temperature of 23° C.

The adduct itself generally includes about 1:5 to 5:1 parts of epoxy or other polymer to elastomer, and more preferably about 1:3 to 3:1 parts or epoxy to elastomer. More typically, the adduct includes at least about 5%, more typically at least about 12% and even more typically at least about 18% elastomer and also typically includes not greater than about 50%, even more typically no greater than about 40% and still more typically no greater than about 35% elastomer, although higher or lower percentages are possible. The elastomer compound suitable for the adduct can be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrite rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. An example of a preferred epoxy/elastomer adduct is sold under the tradename HYPOX RK 8-4 commercially available from CVC Chemical. Examples of additional or alternative epoxy/elastomer or other adducts suitable for use in the present invention are disclosed in U.S. Patent Publication 2004/0204651, which is incorporated herein by reference for all purposes.

The elastomer-containing adduct, when added to the activatable material, preferably is added to modify structural properties of the activatable material such as strength, toughness, stiffness flexural modulus, or the like. Additionally, the elastomer-containing adduct may be selected to render the activatable material more compatible with coatings such as water-borne paint or primer system or other conventional coatings.

Polymer or Copolymer

The activatable material will typically include one or more additional polymers or copolymers, which can include a variety of different polymers, such as plastics, thermoplastics, elastomers, thermosets, thermosettables, combinations thereof or the like. For example, and without limitation, polymers that might be appropriately incorporated into the polymeric admixture include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly (ethyleneimine), polyester, polyurethane, polysiloxane, polyether, polyphosphazine, polyamide, polyimide, polyisobutylene, polyacrylonitrile, poly(vinyl chloride), poly (methyl methacrylate), poly(vinyl acetate), poly(vinylidene chloride), polytetrafluoroethylene, polyisoprene, polyacrylamide, polyacrylic acid, polymethacrylate.

When used, these polymers can comprises a small portion or a more substantial portion of the expandable material (e.g., up to 85% by weight or greater). Preferably, the one or more additional polymers comprises about 0.1% to about 50%, more preferably about 1% to about 20% and even more preferably about 2% to about 10% by weight of the activatable material.

In certain embodiments, it is preferred to include one or more thermoplastic polyethers and/or thermoplastic epoxy resins in the activatable material. When included, the one or more thermoplastic polyethers preferably comprise between about 1% and about 60% by weight of the activatable material, more preferably between about 2% and about 20% by weight of the activatable material and even more preferably between about 3% and about 7% by weight of the activatable material. As with the other materials, however, more or less thermoplastic polyether may be employed depending upon the intended use of the activatable material.

The thermoplastic polyethers typically include pendant hydroxyl moieties. The thermoplastic polyethers may also include aromatic ether/amine repeating units in their backbones, The thermoplastic polyethers of the present is invention preferably have a melt index between about 5 and about 100, more preferably between about 25 and about 75 and even more preferably between about 40 and about 60 grams per 10 minutes for under weight of 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093, which are incorporated herein by reference for all purposes. Advantageously, the thermoplastic polyethers can provide the activatable material with various desirable characteristics such as desirable physical and chemical properties for a wide variety of applications as is further described herein.

Although not required, it is preferable for the polymeric admixture to include one or more ethylene polymers or copolymers such as ethylene acrylates, ethylene acetates or the like. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Impact Modifier

Generally, it is preferable for the activatable material to include at least one impact modifier. As used herein, like with any other ingredients of the present invention, the term "impact modifier" can include one impact modifier or plural impact modifiers. Various impact modifiers may be employed in the practice of the present invention and often include one or more elastomers. It is generally preferable for the impact modifier to be at least 1%, more typically at least 3%, even more typically at least 5% by weight of the activatable material and also preferable for the impact modifier to be less than 50%, more typically less than 30% an even more typically less than 10% by weight of the activatable material, although higher or lower amounts may be used in particular embodiments.

In one embodiment of the present invention, the impact modifier includes at least one core/shell impact modifier and preferably the impact modifier includes a substantial portion of core/shell impact modifier. In one preferred embodiment, the impact modifier is comprised of at least 60%, more typically at least 80% and even more typically at least 97% core/shell impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell impact modifiers are formed by emulsion polymerization and dried by coagulation, spray drying or the like. It is also preferred for the impact modifier to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where hard containing compounds such as styrene, acrylonitrile or methyl methacrylate, are grafted onto core made from polymers of soft or elastomeric containing compounds such as butadiene or ethyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like, Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful impact modifiers include, but are not limited to those sold under the tradename, PARALOID, commercially available from Rohm & Haas Co. One particularly preferred grade of PARALOID impact modifier is polymethyl methacrylate shell and MBS core modifier sold under the designation EXL-2691A.

Blowing Agent

One or more blowing agents may be added to the activatable material for producing inert gasses that form, as desired, an open and/or closed cellular structure within the activatable material. In this manner, it may be possible to lower the density of articles fabricated from the material. In addition, the material expansion can help to improve seating capability, acoustic damping or both.

The blowing agent may include one or more nitrogen containing groups such as amides, amines and the like. Examples of suitable blowing agents include azodicarbonamide, dinitrosopentamethylenetetramine, 4,4$_i$-oxy-bis-(benzene-sulphonylhydrazide), trihydrazinotriazine and N,N$_i$-dimethyl-N,N$_i$-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages. In a preferred embodiment, blowing agent is employed in an amount that assist the wetting function of the adhesive (e.g., in an amount between 0.01 and 0.30% by weight)>

In one embodiment, the present invention contemplates the omission of a blowing agent. Preferably, however, the material, the blowing agent or both of the present invention are thermally activated. Alternatively, other agents may be employed for realizing activation by other means, such as moisture, radiation, or otherwise.

Curing Agent

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

Preferably the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

Filler

The activatable material may also include one or more fillers, including but not limited to particulated materials (e.g., powder), beads, microspheres, or the like. Preferably the filler includes a relatively low-density material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide fibers (e.g., Kevlar), antioxidants, and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the filters in the activatable material can range from 4% or less to 70% or greater by weight of the activatable material, but more typical at least about 25%, 30% or 38% and typically less than about 70%, 65% or 50% by weight of the activatable material. According to some embodiments, the activatable material may include from about 0% to about 3% by weight, and more preferably slightly less that 1% by weight clays or similar fillers, Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

It is contemplated that most nearly any additional chemicals, materials or otherwise may be added to the activatable material assuming they are suitable for the activatable material and suitable for a chosen application of the activatable material.

Other additives, agents or performance modifiers may also be included in the activatable material as desired, including but not limited to a UV resistant agent, a flame retardant, an impact modifier, a heat stabilizer, a colorant, a processing aid, a lubricant, a reinforcement (e.g., chopped or continuous glass, ceramic, aramid, or carbon fiber, particulates or the like).

When determining appropriate components for the activatable material, it may be important to form the material such that it will only activate (e.g., flow, foam or otherwise change states) at appropriate times or temperatures. For instance, in some applications, it is undesirable for the material to be reactive at room temperature or otherwise at the ambient temperature in a production environment. More typically, the activatable material becomes activated to flow at higher processing temperatures. As an example, temperatures such as those encountered in an automobile assembly plant may be appropriate, especially when the activatable material is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher.

Formation and Application of the Activatable Material

Formation of the activatable material can be accomplished according to a variety of new or known techniques. Preferably, the activatable material is formed as a material of substantially homogeneous composition. However, it is contemplated that various combining techniques may be used to increase or decrease the concentration of certain components in certain locations of the activatable material.

According to one embodiment, the activatable material is formed by supplying the components of the material in solid form such as pellets, chunks and the like, in liquid form or a combination thereof. The components are typically combined in one or more containers such as large bins or other containers. Preferably, the containers can be used to intermix the components by rotating or otherwise moving the container. Thereafter, heat, pressure or a combination thereof may be applied to soften or liquidize the components such that the components can be intermixed by stirring or otherwise into a single homogenous composition.

According to another embodiment the activatable material may be formed by heating one or more of the components that is generally easier to soften or liquidize such as the polymer based materials to induce those components into a mixable state. Thereafter, the remaining components may then be intermixed with the softened components.

Depending upon the components used, it may be important to assure that the temperature of the components remains below certain activation temperatures that might cause the activatable material to activate (e.g., form gasses, flow, cure or otherwise activate) or both. Notably, when the activatable material contains a blowing agent, it is typically desirable to maintain the temperature of the activatable material below a temperature that will activate the blowing agent during formation of the activatable material or before the activatable material is applied to a surface. In situations where it is desirable to maintain the activatable material at lower temperatures it may be desirable to maintain the components in a semi-solid or viscoelastic state using pressure or a combination of pressure and heat to intermix the components of the activatable material. Various machines have been designed to applying heat, pressure or both to materials.

After formation of the activatable material, the material is typically applied to a surface or substrate and activated. Activation of the material may include at least some degree of foaming in situations where the activatable material includes a blowing agent. Such foaming or bubbling can assist the activatable material in wetting a substrate and forming an intimate bond with the substrate. Alternatively, however, it shall be recognized that the activatable material may be activated to flow without foaming or bubbling and may still substantially wet the substrate to form an intimate bond. Formation of the intimate bond will typically but not necessarily occur upon curing of the activatable material.

It shall be understood that, depending upon its intended application the activatable material may be applied and activated in different ways and at different times. Thus, exemplary uses of the activatable material are discussed below to illustrate preferred methodologies of application and activation of the activatable material. In particular, the activatable material may used for, amongst others, reinforcement, sealing and adhering, acoustic baffling or the like.

Reinforcement

The activatable material may be used to reinforce structural members of an article of manufacture. When used for reinforcement, the activatable material may be employed by itself, may be employed in conjunction with other materials (e.g., a backing), may be applied to a carrier member or the like.

According to one embodiment, the activatable material of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof or the like.

The carrier member may be selected from a variety of conventional and novel configurations. The activatable material of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

Examples of carrier members, structural reinforcement applications or the like, which may be employed in the present invention are disclosed in U.S. Pat. Nos. 6,474,723; 6,467,834; 6,419,305; 6,358,584; 6,311,452; 6,296,298; 6,263,635, all of which are hereby incorporated by reference. Other examples are disclosed in U.S. Patent Application or Publication Nos. U.S. Pat. No. 6,786,533: US 2003/0176128: US 2003-0183317: U.S. Pat. Nos. 6,855,652: 6,668,457: 6,883,858: 6,793,274: 6,729,425: all of which are also incorporated herein by reference for all purposes.

Structural Adhesive

Figure 2:
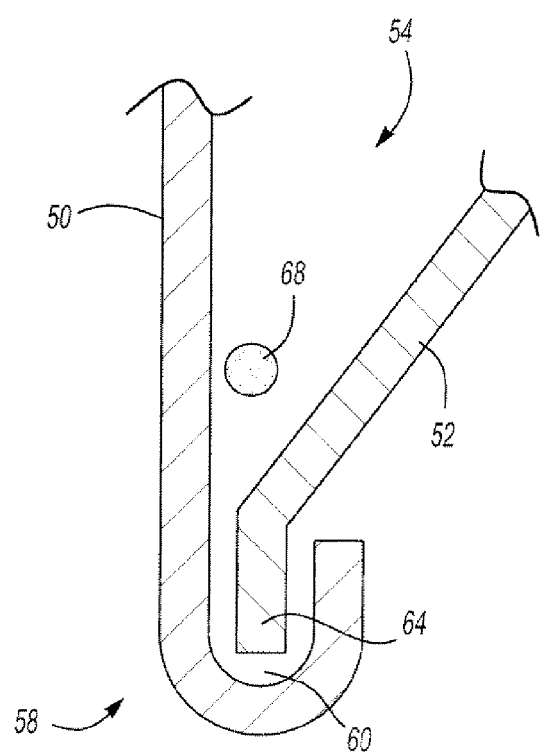
FIG. 2 is a sectional view of an activatable material being applied to the members of FIG. 1 in accordance with an aspect of the present invention.
Figure 3:
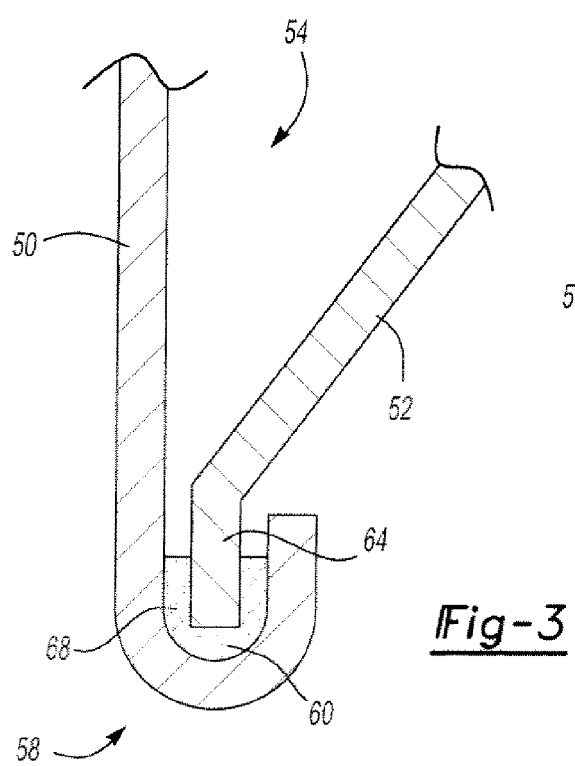
FIG. 3 is a sectional view of an activatable material after applications and activation and joining the members of FIGS. 1 and 2 in accordance with the aspect of the present invention.

According to one preferred embodiment, the activatable material according to the present invention is employed as a structural adhesive material (e.g., a structural hot melt adhesive material). In such an embodiment, the material is typically activated and cured e.g., at temperatures common to e-coat or automotive painting operations) to adhere to a first member and a second member. Contact with attachment surface of the first member and the second member may occur prior to or during activation and curing of the material. Examples of structural adhesive applications are disclosed in U.S. patent application Ser. Nos. 10/234,902; 10/386,287; 601451,811, all of which are incorporated herein by reference for all purposes Referring to FIGS. 1-3, there is illustrated a first member 50 and a second member 52 that come together to form a joint 54 (e.g. a hem flange joint) hem flange. As shown the first member 50 has an end portion 58 that forms a cavity 60 for receiving a free end 64 of the second member 52, which may be positioned as desired within the cavity 60. An activatable material 68 according to the present invention is also positioned within the cavity 60 such that upon activation and curing of the material 68, the first member 50 is adhered to the second member 52. Generally, the activatable material 68 may be applied as a liquid or a solid. According to one preferred embodiment, however, the activatable material 68 is provided as solid preferably substantially non-tacky strip that is sized to be positioned in the cavity 60 of the first member 50.

Of course, it is contemplated that the activatable material of the present invention may be employed to structurally adhere any members together. Examples of suitable materials and applications, which may benefit from the activatable material of the present invention are included in U.S. Pat. No. 5,985,435, which is incorporated herein for all purposes.

One exemplary activatable material that is particularly suitable for use as a structural adhesive is in table II below.

TABLE II

| Ingredient | Weight % |
| --- | --- |
| Epoxy/Elastomer Adduct | 25.955 |
| Epoxy Resin | 15.395 |
| Thermoplastic Polyether | 4.525 |
| Impact modifier | 6.165 |
| Blowing agent | 0.165 |
| Pigment | 0.05 |
| Curing Agent/Accelerator or both | 4.72 |
| Filler | 43.025 |

While table II provides one specific formulation, it is contemplated that weight percentages of the various components may be varied by ±20%, by ±50% or more, Moreover, components may be removed or added and component may be replaced.

Advantageously, in preferred embodiments, the adhesive material can be provided as masses (e.g., as elongated strips) in containers for transportation purposes without dividers (e.g., release paper or otherwise) dividing the masses from each other. Several masses (e.g., 10, 30, 80 or more masses) can be placed in a container such as a box or otherwise and be allowed to directly contact each other and transported or shipped in such condition from one location to another. Then, at the second location, the masses, in the preferred embodiments, can be separated from each other with relative ease since, due to their non-blocking nature, the masses do not significantly stick or adhere to each other.

Extrusion

Regardless of the particular use, it has been found that activatable materials according to the present invention are particularly suitable for processing and/or application via extrusion. According to one preferred embodiment of the present invention, various components may be premixed into one, two or more pre-mixtures and introduced at one or various locations in a single or twin-screw extruder. Thereafter, the heat and pressure provided by the extruder mixes the activatable material into a single generally homogeneous composition, and preferably does so without activating the material. The material of the present invention may be applied, by extrusion, to any suitable surface of a carrier, a member of an article of manufacture (e.g., an automotive vehicle) or the like. In one embodiment, an automated or robotic extrusion applicator (e.g., a mini-applicator) is employed. Examples of these types of application and applicators are disclosed in U.S. Pat. No. 5,358,397 and U.S. patent application Ser. No. 10/342,025 both of which are hereby incorporated by reference for all purposes.

According to another preferred application, the activatable material of the present invention can be formed as masses (e.g., strands, strips or the like), which can be packaged together in contact with each other or separated (e.g., by release tape). According to such embodiment, the masses are preferably separable from each other without experiencing any substantial cohesive failure from bonding with adjacent masses. Thus, the masses may be peeled away from one another and applied to a substrate (e.g., a carrier, a member or otherwise) in manners described herein. Preferably such activatable material can be heated to expand and cure as described herein as well, although not necessarily required.

Advantageously, the activatable material of the present invention has shown valuable properties in its applications. Moreover, activatable materials according to the present invention can exhibit relatively high strength, high moduli or both while also exhibiting relatively high strain to failure ratios. The activatable material, particularly for certain combinations and amounts of ingredients (e.g., combination of certain amounts of adduct, amounts of impact modifier or both) as disclosed herein, can exhibit desirable toughness and/or T-peel strengths. As an example, the activatable material of the present invention has been found to exhibit, according to ASTM D 1876-01, T-peel strengths of at least about 2 N/mm, although possible less, at least about 3.7 N/mm or even at least about 5.5 N/mm. The activatable material, particulary when provided as a solid, can be less susceptible to breakage (erg., chipping or the like).

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of adhesion, the method comprising:
    extruding a mass of a tack-free activatable material, the activatable material including:

i) between about 10 and about 20% by weight of an epoxy resin;
ii) an epoxy/elastomer adduct in an amount at least approximately 20 to less than about 30% by weight of the activatable material, wherein the adduct is a solid at a temperature of 23° C.;
iii) between about 3 and about 7% by weight of one or more thermoplastic polyethers;
iv) between about 5 and about 10% by weight of the activatable material of a core/shell polymer impact modifier that includes a core of a first polymeric material and a shell of a second polymeric material, wherein second polymeric material is grafted onto and encapsulates the first polymeric material; and the first polymeric material has a glass translation temperature of at least about 10° C. below a glass transition temperature of the second polymeric material; and
v) between about 0.001 and about 7% by weight of a curing agent;
locating the activatable material adjacent a first surface and a second surface of an automotive vehicle, the first surface and second surface being part of a hem flange joint wherein the activatable material is located adjacent the first surface and the second surface as a substantially tack-free elongated strip; and
activating the activatable material to bond the activatable material to the first surface and second surface;
wherein the glass transition temperature of the first polymeric material is less than about 23° C. and the glass transition temperature of the second polymeric material is at least about 23° C.

2. A method as in claim 1 wherein the activatable material is activated in an e-coat or paint oven.

3. A method as in claim 1 wherein the activatable material includes a blowing agent.

4. A method as in claim 3 wherein the blowing agent is selected from an azodicarbonamide, a dinitrosopentamethylenetetramine, a 4,4$_i$-oxy-bis-(benzenesulphonylhydrazide), a trihydrazinotriazine or a N,N$_i$-dimethyl-N,N$_i$-dinitrosoterephthalamide.

5. A method as in claim 4 wherein the activatable material includes at least 35% by weight filler material.

6. A method as in claim 1 wherein the first surface is part of a first member of the article of manufacture and the second surface is part of a second member of the article of manufacture.

7. A method as in claim 6 wherein the core/shell impact modifier has a polymethyl methacrylate shell and butadiene styrene core.

8. A method of adhesion, the method comprising:
extruding a mass of a tack-free activatable material, the activatable material including:
i) between about 10 and about 20% by weight of an epoxy resin;
ii) an epoxy/elastomer adduct in an amount that ranges from about 20 to about 30% by weight of the activatable material, wherein the adduct is a solid at a temperature of 23° C.;
iii) between about 3 and about 7% by weight of one or more thermoplastic polyethers;
iv) between about 5 and about 10% by weight of the activatable material of a core/shell polymer impact modifier that includes a core of a first polymeric material and a shell of a second polymeric material, wherein second polymeric material is grafted onto and encapsulates the first polymeric material; and the first polymeric material has a glass translation temperature of at least about 10° C. below a glass transition temperature of the second polymeric material; and
v) between about 0.001 and about 7% by weight of a curing agent;
vi) at least 35% by weight of a filler material;
locating the activatable material adjacent a first metal surface of a first member of an automotive vehicle and a second metal surface of a second member of the automotive vehicle wherein the activatable material is located adjacent the first surface and second surface as a substantially tack-free elongated strip; and
activating the activatable material to bond the activatable material to the first member and the second;
wherein the glass transition temperature of the first polymeric material is less than about 23° C. and the glass transition temperature of the second polymeric material is at least about 23° C.

9. A method as in claim 8 wherein the first surface and second surface are part of a hem flange joint wherein the first member has an end portion that forms a cavity for receiving a free end of the second member.

10. A method as in claim 9 wherein the activatable material is located, during the locating step, within the cavity formed by the end portion of the first member as the substantially tack-free elongated strip.

11. A method as in claim 8 wherein the activatable material is activated in an e-coat or paint oven.

12. A method as in claim 8 wherein the activatable material includes a blowing agent.

13. A method as in claim 8 wherein the core/shell impact modifier has a polymethyl methacrylate shell and butadiene styrene core.

14. The method of claim 1, wherein the adhesive material exhibits a T-peel strength according to ASTM D 1876-01 of at least about 2 N/mm.

15. The method of claim 1, wherein
the activatable material includes between about 20% and about 30% by weight of the epoxy/elastomer adduct;
the activatable material further comprises a blowing agent that is selected from an azodicarbonamide, a dinitrosopentamethylenetetramine, a 4,4$_i$-oxy-bis-(benzenesulphonylhydrazide), a trihydrazinotriazine or a N,N$_i$-dimethyl-N,N$_i$-dinitrosoterephthalamide;
the activatable material includes about 30 to about 50 % by weight of a filler material;
the one or more thermoplastic polyethers has a melt index that ranges from about 5 to about 100 g/10 min for under weight of 2.16 Kg at a temperature of about 190° C.; and
the core/shell impact modifier has a polymethyl methacrylate shell and butadiene styrene core.

16. The method of claim 1, wherein the one or more thermoplastic polyethers are formed by reacting an amine with an average functionality of 2 or less with a glycidyl ether.

17. The method of claim 1, wherein the one or more thermoplastic polyethers are polyetheramines, poly(amino ethers), copolymers of monoethanolamine and diglycidyl ether, or any combinations thereof.

18. The method of claim 17, wherein the one or more thermoplastic polyethers are polyetheramines.

19. The method of claim 8, wherein the one or more thermoplastic polyethers are formed by reacting an amine with an average functionality of 2 or less with a glycidyl ether.

20. The method of claim 8, wherein the one or more thermoplastic polyethers are polyetheramines, poly(amino ethers), copolymers of monoethanolamine and diglycidyl ether, or any combinations thereof.

* * * * *